US012562065B2

(12) United States Patent　　(10) Patent No.: US 12,562,065 B2
Schwartz　　(45) Date of Patent: Feb. 24, 2026

(54) ASSISTED TURBULENCE EFB INTERACTION

(71) Applicant: THE BOEING COMPANY, Chicago, IL (US)

(72) Inventor: Samantha A. Schwartz, Castle Pines, CO (US)

(73) Assignee: The Boeing Company, Arlington, VA (US)

( * ) Notice: Subject to any disclaimer, the term of this patent is extended or adjusted under 35 U.S.C. 154(b) by 351 days.

(21) Appl. No.: 17/529,703

(22) Filed: Nov. 18, 2021

(65) Prior Publication Data

US 2022/0189315 A1　　Jun. 16, 2022

Related U.S. Application Data

(60) Provisional application No. 63/125,715, filed on Dec. 15, 2020.

(51) Int. Cl.
　　*G05D 1/00*　　　(2024.01)
　　*B64D 45/00*　　(2006.01)
　　　　　(Continued)

(52) U.S. Cl.
　　CPC ............... *G08G 5/21* (2025.01); *B64D 45/00* (2013.01); *G08G 5/34* (2025.01);
　　　　　(Continued)

(58) Field of Classification Search
　　CPC .................................................... G08G 5/0021
　　See application file for complete search history.

(56) References Cited

U.S. PATENT DOCUMENTS 8,825,234 B2　9/2014　Williams et al.
9,043,043 B1 *　5/2015　Gribble ................ G05D 1/0676
　　　　　　　　　701/16
(Continued)

FOREIGN PATENT DOCUMENTS

EP　　　2555105 A2　　2/2013
EP　　　2667295 A2　　11/2013
　　　(Continued)

OTHER PUBLICATIONS

European Patent Office, The Extended European Search Report for Application 21193731.3-1203 dated Feb. 16, 2022.
(Continued)

*Primary Examiner* — Vivek D Koppikar
*Assistant Examiner* — Paul W Arellano
(74) *Attorney, Agent, or Firm* — Joseph M. Butscher; Carroll, Hoette & Butscher, LLC

(57)　　　　ABSTRACT

The present disclosure provides a turbulence management system for providing suggestions to a pilot that mitigate the effects of turbulence. These suggestions can be output to the pilot using an EFB. As mentioned above, an EFB can be communicatively coupled to a FMS such that the EFB has access to the data in the FMS. From the pilot's interactions with the FMS, the EFB can identify the pilot's intent such as landing, taking off, plotting a course change, changing altitude, maintaining a cruising altitude, etc. Once the intent is known, the EFB can output a suggestion to the pilot that satisfies the intent, but mitigates the harmful effects of turbulence. In one aspect, this suggestion is generated using the flight plant and aircraft metrics available from the FMS.

20 Claims, 4 Drawing Sheets

(51) Int. Cl.
| | |
|---|---|
| *G08G 5/21* | (2025.01) |
| *G08G 5/34* | (2025.01) |
| *G06F 3/04842* | (2022.01) |
| *G06F 3/0488* | (2022.01) |

(52) U.S. Cl.
CPC .. *B64D 2045/0075* (2013.01); *G06F 3/04842*
(2013.01); *G06F 3/0488* (2013.01)

(56) References Cited

U.S. PATENT DOCUMENTS

| | | | |
|---|---|---|---|
| 10,503,317 | B2 | 12/2019 | Domaradzki et al. |
| 10,926,869 | B2 * | 2/2021 | Huynh ................. B64C 13/503 |
| 2006/0214926 | A1 | 9/2006 | Kolmykov-Zotov et al. |
| 2007/0236475 | A1 | 10/2007 | Wherry |
| 2009/0201246 | A1 * | 8/2009 | Lee ....................... G06F 1/1643 |
| | | | 345/156 |
| 2011/0007035 | A1 | 1/2011 | Shai |
| 2011/0078625 | A1 | 3/2011 | Mumford et al. |
| 2013/0080043 | A1 | 3/2013 | Ballin et al. |
| 2013/0314328 | A1 | 11/2013 | Singer et al. |
| 2014/0035827 | A1 | 2/2014 | Hyde et al. |
| 2014/0062893 | A1 | 3/2014 | Kawalkar |
| 2014/0201674 | A1 | 7/2014 | Holz |
| 2014/0222254 | A1 * | 8/2014 | Ribich ................... F16M 13/00 |
| | | | 361/679.56 |
| 2014/0240242 | A1 | 8/2014 | Kawalkar et al. |
| 2015/0120097 | A1 * | 4/2015 | Hathaway .......... H04L 63/0428 |
| | | | 701/14 |
| 2017/0334576 | A1 * | 11/2017 | Shams .................. B64D 43/00 |
| 2019/0171337 | A1 | 6/2019 | Perrin et al. |
| 2020/0264599 | A1 * | 8/2020 | Sahay .................. G06F 3/1423 |
| 2021/0333806 | A1 * | 10/2021 | Urbanec ................ B64C 13/16 |

FOREIGN PATENT DOCUMENTS

| | | |
|---|---|---|
| EP | 2818994 A1 | 12/2014 |
| EP | 3214535 | 9/2017 |

OTHER PUBLICATIONS

The European Search Report for Application No. 16199059.3 dated Aug. 3, 2017.
Communication re EP 21 193 731.3-1009, dated Apr. 15, 2025.

* cited by examiner

200

RECEIVE PILOT INPUT AT FLIGHT MANAGEMENT SYSTEM — 205

INFER PILOT INTENT FROM THE PILOT INPUT — 210

RECEIVE AN INDICATION OF TURBULENCE — 215

RECEIVE AIRPLANE METRICS — 220

DETERMINE A SUGGESTION TO MITIGATE THE EFFECTS OF THE TURBULENCE WHILE STILL SATISFYING THE PILOT'S INTENT — 225

OUTPUT THE SUGGESTION ON THE PORTABLE DEVICE — 230

400

OUTPUT A SUGGESTION TO MITIGATE CURRENT OR
PREDICTED TURBULENCE — 405

TURBULENCE
CURRENTLY
DETECTED? 410

NO

YES

OPERATE THE PORTABLE DEVICE IN A TURBULENCE MODE — 415

PILOT
CHOOSE THE
SUGGESTION? 420

NO

CONTINUE WITH CURRENT
STATE OF THE FLIGHT
MANAGEMENT SYSTEM

YES

UPDATE THE FLIGHT MANAGEMENT SYSTEM — 425

ASSISTED TURBULENCE EFB INTERACTION

CROSS-REFERENCE TO RELATED APPLICATIONS

This application claims benefit of and priority to U.S. Provisional Patent Application Ser. No. 63/125,715 filed on Dec. 15, 2020, which is hereby incorporated by reference in its entirety.

FIELD

The present disclosure generally relates to turbulence experienced by aircraft and, in particular, to providing suggestions to a pilot for mitigating or avoiding turbulence.

BACKGROUND

A flight management system (FMS) is a fundamental component in modern avionics. The FMS is a specialized computer system that automates a wide variety of in-flight tasks, reducing the workload on the flight crew to the point that modern civilian aircraft no longer carry flight engineers or navigators. A primary function is in-flight management of the flight plan. Using various sensors to determine the aircraft's position, the FMS can guide the aircraft along the flight plan. From the cockpit, the FMS is normally controlled through a Control Display Unit (CDU) which incorporates a small screen and keyboard or touchscreen. The FMS sends the flight plan for display to the Electronic Flight Instrument System (EFIS), Navigation Display (ND), or Multifunction Display (MFD). The FMS can be summarized as being a dual system that includes the Flight Management Computer (FMC), CDU, and a bus.

Updates to the FMS, and more specifically, to the FMC, have to satisfy a stringent certification process. This makes updating the FMS a slow and expensive process. Instead of adding new or updated features to the FMS, an Electronic Flight Bag (EFB) can instead be added. The EFB is typically a portable, handheld wireless device (e.g., a tablet or laptop) that a pilot can use to interface with the FMS. The EFB is permitted to communicate with the FMS so that it can provide what is often referred to as supplemental aeronautic information to the pilot. Updating the features of the EFB, however, do not require the same rigorous certification process as the FMS, which makes it an ideal platform to easily and quickly implement new features and interfaces that a pilot may find useful. Some typical uses of the EFB include replacing paper-based reference material (e.g., aircraft operating manual, flight-crew operation manual, and navigation charts), automating functions previously conducted by hand (e.g., take-off performance calculations), displaying weather patterns, and displaying airport issues and delays. This information can be provided to the pilot in real-time.

SUMMARY

The present disclosure provides, in one aspect, a method that includes inferring pilot intent based on pilot input into a FMS of an aircraft; receiving, at a portable device, an indication of turbulence corresponding to the aircraft; receiving, at the portable device, aircraft metrics from the FMS; determining, at the portable device, a suggestion based on the aircraft metrics to mitigate the effects of the turbulence while still satisfying the pilot intent; and outputting the suggestion to a pilot using the portable device.

The present disclosure provides, in one aspect, a portable device that includes a display and a turbulence manager. The turbulence manager is configured to infer pilot intent based on pilot input into a FMS in an aircraft, receive an indication of turbulence corresponding to the aircraft, receive aircraft metrics from the FMS, determine a suggestion to mitigate the effects of the turbulence while still satisfying the pilot intent based on the aircraft metrics, and output the suggestion to a pilot using the display.

The present disclosure provides, in one aspect, a non-transitory computer readable storage medium that includes computer readable program code. The computer readable program code, when executed by a processor, performs an operation. The operation includes inferring pilot intent based on pilot input into a FMS of an aircraft; receiving, at a portable device, an indication of turbulence corresponding to the aircraft; receiving, at the portable device, aircraft metrics from the FMS; determining, at the portable device, a suggestion based on the aircraft metrics to mitigate the effects of the turbulence while still satisfying the pilot intent; and outputting the suggestion to a pilot using the portable device.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects herein describe a turbulence management system for providing suggestions to a pilot that mitigate the effects of turbulence. These suggestions can be output to the pilot using an Electronic Flight Bag (EFB). As mentioned above, an EFB can be communicatively coupled to a FMS such that the EFB has access to the data in the flight management system (FMS). This enables the EFB to learn such things as a pilot's selection or input to the FMS, the flight plan of the aircraft, and aircraft metrics (e.g., weight, fuel load, fuel burn, altitude, etc.). From the pilot's interactions with the FMS, the EFB can identify the pilot's intent such as landing, taking off, plotting a course change, climbing or descending to a certain altitude, maintaining a cruising altitude, etc. In general, the pilot intent is a desired action or actions the pilot wants the aircraft to perform. Once the intent is known, the EFB can output a suggestion to the pilot that satisfies the intent, but mitigates the harmful effects of turbulence. In one aspect, this suggestion is generated using the flight plant and aircraft metrics available from the FMS. For example, if the EFB determines the pilot's intent is to climb to a different altitude, the EFB can provide a suggestion that would still result in the plane reaching a higher altitude but mitigate turbulence and reduce the fuel burn by 5% relative to proceeding on the current course.

In addition to outputting the suggestion on the EFB, the EFB can use a turbulence mode to prevent the pilot from entering an erroneous instruction into the EFB. For example, a display system in the EFB moves at least a portion of a displayed graphical user interface (GUI) in response to turbulent motions in the vehicle (e.g., an aircraft). To help the user touch the desired interactive element in the GUI, in one aspect, the display system tracks the movement of the hand or finger of the user to determine its position relative to the screen displaying the GUI and maintains the spatial relationship of the hand or finger to the screen during turbulent motions by adjusting the GUI. In one aspect, the display system shifts the location of the GUI in the screen such that at least a portion of the GUI remains in a fixed spatial relationship with the finger of the user. Thus, if the user touches the screen soon after the turbulent motion, the user touches the intended location of the GUI rather than an unintended location on the screen.

Figure 1:
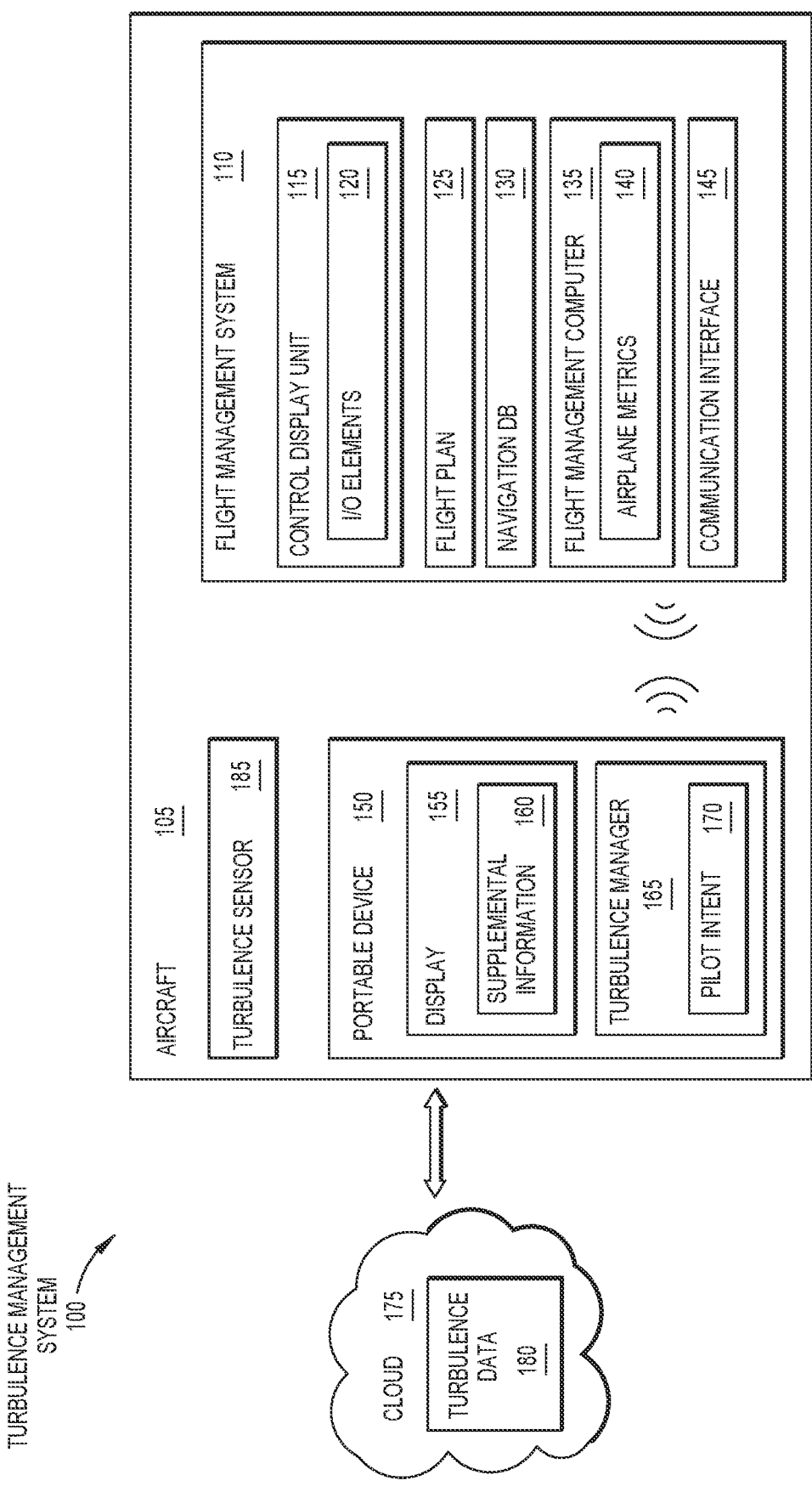
FIG. 1 is a block diagram of a turbulence management system.

FIG. 1 is a block diagram of a turbulence management system 100, which includes an aircraft 105 communicatively coupled to a cloud 175. As shown, the aircraft 105 includes a FMS 110, a portable device 150 (e.g., an EFB) and a turbulence sensor 185. The FMS 110 includes a control display unit (CDU) 115, flight plan 125, navigation database (DB) 130, flight management computer (FMC) 135, and a communication interface 145. In one aspect, some or all of the components in the FMS 110 are integrated into a cockpit of the aircraft 105.

The CDU 115 is a display unit that provides I/O elements 120 (e.g., physical buttons, a keyboard, touchscreen buttons, sliders, toggles, switches, etc.) that permit the pilot to provide selections to the FMS 110. These selections can change the behavior of the aircraft 105 such as changing speed, thrust, direction, etc. The CDU 115 provides an interface for the pilot to enter instructions to the FMS 110 as well as see aircraft metrics such as current altitude, remaining fuel, fuel burn, temperatures, and the like. In one aspect, a display of the CDU 115 is separate from the I/O element 120. For example, the I/O elements 120 may be disposed in a center console of the cockpit while the display may be disposed in front of the pilot seats. However, in other aspects, the display and I/O elements 120 are disposed at the same location. More details of the CDU 115 are provided in FIG. 3 below.

The flight plan 125 may include different waypoints that define a path from the aircraft's starting point to its destination. The flight plan 125 may also indicate the altitude the aircraft should fly. The flight plan 125 may initially be assigned by air traffic control, but may be modified in flight due to events such as turbulence or congestion.

The navigation DB 130 contains the elements from which the flight plan 125 is constructed. These may be defined via the ARINC 424 standard. The navigation DB 130 is updated periodically in order to ensure that its contents are current. In one aspect, the navigation DB 130 contains only a subset of the ARINC/AIRAC data, relevant to the capabilities of the FMS 110.

The FMC 135 includes aircraft metrics 140 such as weight, fuel load, fuel burn, altitude, etc. For example, these metrics 140 may be displayed by the CDU 115. In addition to being accessible to other components in the FMS 110, the aircraft metrics 140 are also accessible to the portable device 150. In this example, the FMS 110 includes a communication interface 145 (e.g., a wireless communication interface) that permits communication between the FMS 110 and a wireless interface (not shown) in the portable device 150. That way, the portable device 150 can retrieve the aircraft metrics 140 and provide instructions to the FMS 110 in response to input provided by the pilot.

The portable device 150 may be any portable or handheld computing device which has memory and a processor. Non-limiting examples include a tablet, smartphone, or a laptop. The portable device 150 can be a specialized computing device designed to be used as an EFB, or an off-the-shelf consumer device that has specialized software applications loaded onto it to serve as an EFB. In this example, the portable device 150 includes a display 155 which can be used to display supplemental information 160 to the pilot. The supplemental information 160 can include information that is stored in the FMS 110 (such as the flight plan 125, data stored in the navigation DB 130, and the aircraft metrics 14) as well as other information that might not be stored in the FMS 110 such as manuals, tutorials, checklists, etc. Enabling communication between the FMS 110 and the portable device 150 permits the pilot to access information stored in the FMS 110 but without using the interfaces and I/O elements of the FMS 110, which may be cumbersome. Instead, the pilot can use the I/O elements and interfaces on the portable device 150 to navigate and filter the supplemental information 160 which may be more user friendly than the FMS 110. For example, updates to the portable device 150 may not have to go through the same rigorous certification process as updates to the FMS 110. Thus, the portable device 150 (and the software executing on the device 150) may be changed and updated quickly.

The portable device 150 can also be used to provide suggestions to the pilot in response to predicted or measured turbulence. To do so, the portable device 150 includes a turbulence manager 165 (e.g., a software application) which receives turbulence measurements from a turbulence sensor 185 (e.g., an accelerometer) disposed on the aircraft 105. Alternatively, the turbulence manager 165 can receive turbulence data 180 from the cloud 175 which can indicate spots in the flight plan 125 where the aircraft 105 is likely to encounter turbulence.

Using actual or predicted turbulence, the turbulence manager 165 can provide suggestions to the pilot for avoiding or mitigating the turbulence. To do so, the turbulence manager 165 determines the intent 170 of the pilot. In one aspect, the turbulence manager 165 accesses the data in the FMS 110 to determine the pilot intent 170. For example, the pilot may issue commands to the FMS 110 that indicate the pilot intent 170, such as following a takeoff/landing procedure, changing altitude, changing course, changing thrust, and the like. After identifying the pilot intent 170, the turbulence manager 165 can provide a suggestion that mitigates or eliminates turbulence, but still satisfies the pilot intent 170. That is, if the intent 170 of the pilot is to land the aircraft 105, the turbulence manager 165 can suggest a different decent rate, or different speed which would still permit the pilot to land the aircraft 105 (i.e., still satisfy the intent 170) but would reduce the effects of turbulence. Further, this suggestion can be derived using data in the FMS 110. Thus, the suggestion provided by the portable device 150 can be customized to the current state of the aircraft. This is advantageous relative to an external entity (e.g., an air traffic controller) providing a suggestion to mitigate turbulence since that external entity does not have access to the data in the FMS 110 (e.g., the aircraft metrics 140).

Figure 2:
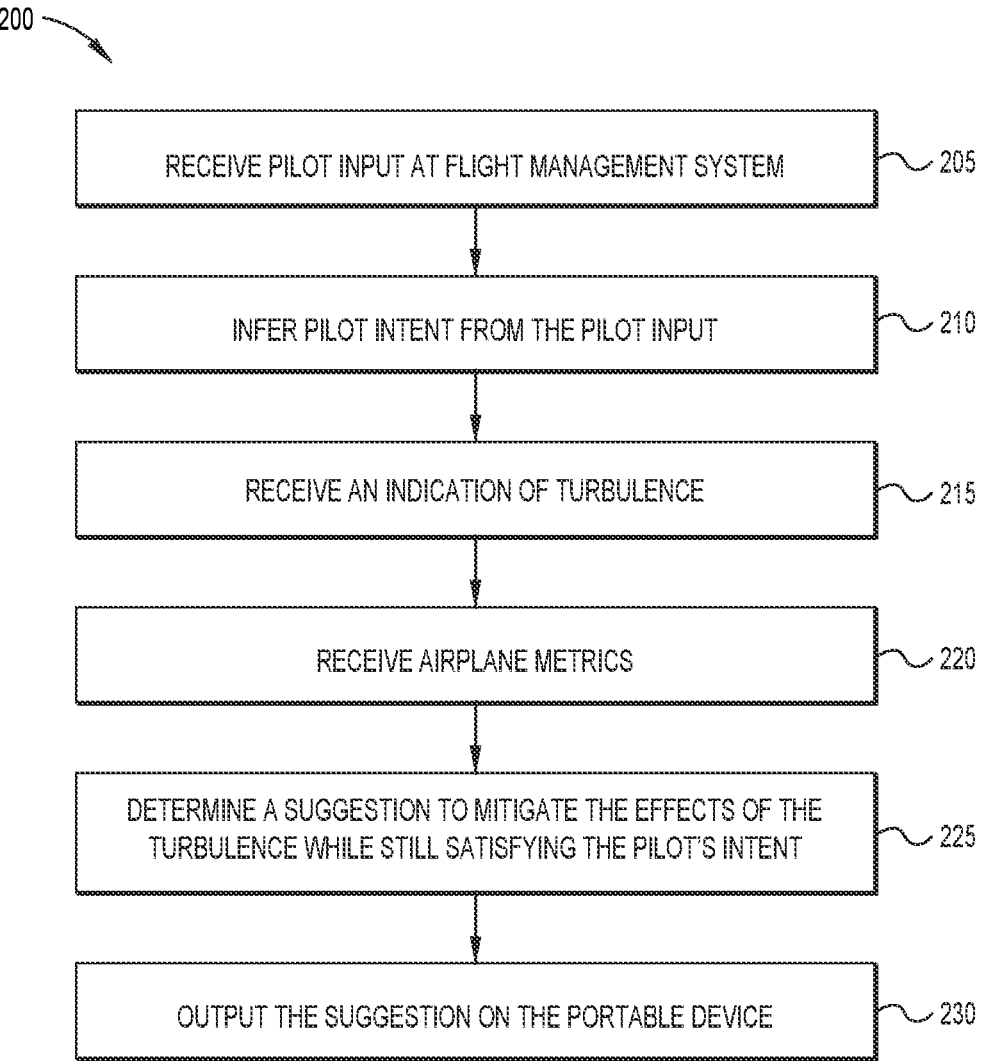
FIG. 2 is a flowchart for outputting a suggestion to a pilot for mitigating turbulence.

FIG. 2 is a flowchart of a method 200 for outputting a suggestion to a pilot for mitigating turbulence. At block 205, the FMS receives pilot input. The pilot may interact with the CDU using I/O elements, such as making a selection that alters the behavior of the plane (e.g., change course, reduce thrust, change speed/altitude, etc.).

At block 210, the turbulence manager infers pilot intent from the pilot input into the FMS. Put differently, the turbulence manager determines the pilot intent from input (e.g., commands or selections) made by the pilot when interacting with the FMS. As mentioned above, the turbulence manager may be executing on a portable device that is external to the FMS. Nonetheless, the portable device is communicatively coupled to the FMS so that it can access data stored in the FMS. More specifically, the turbulence manager can learn from the FMS the different input provided by the pilot. Using the pilot's selections, the turbulence manager can infer the intent of the pilot.

For example, the pilot may input commands to the FMS indicating the pilot wants to land the aircraft. The turbulence manager can have a table that maps a specific input (or inputs) to a pilot intent. That is, certain input selections (or sets of selections) made by the pilot can be mapped to different pilot intents. In another aspect, intent can be inferred using the location of the aircraft, e.g., where the aircraft is on its flight path (e.g., near the destination airport which may indicate the pilot is intending to land the aircraft). In any case, the pilot intent can be inferred from data stored in the FMS. While the aspects herein assume that the turbulence manager identifies the pilot intent, in another example, the FMS may infer the pilot intent and transmit this intent to the turbulence manager.

In another example, the pilot may input commands to the FMS indicating she wants to change altitude, or change the flight plan. In these examples, these input commands can be mapped by the turbulence manager to a specific intent. In one aspect, the pilot intent may be to maintain the current flight plan if, for example, the pilot has not provided any input to the FMS recently. In that case, a lack of pilot input into the FMS can identify the pilot intent.

At block 215, the turbulence manager receives an indication of turbulence. This indication may be a measured, actual turbulence current affecting the aircraft, or a predicted turbulence that the aircraft may encounter in the future. Actual turbulence may be detected using a turbulence sensor disposed on the aircraft, while the predicted turbulence may be identified using turbulence data stored in the cloud (e.g., the cloud 175 in FIG. 1). For example, as aircrafts fly in a specific geographic region, they can report areas of turbulence that they encounter. This information can be stored in the cloud and pushed to other aircrafts flying in (or soon to be flying in) the same region so the pilots know to expect turbulence. In another aspect, the predicted turbulence is determined by identifying weather patterns which are known to generate turbulence.

At block 220, the turbulence manager receives the aircraft metrics stored in the FMS. These metrics can include real-time data corresponding to the aircraft such as its weight, fuel burn, altitude, thrust, speed, and the like. As mentioned above, this data may not be available to external entities (e.g., ground traffic control), but is available to the portable device when it is in the cockpit.

At block 225, the turbulence manager determines a suggestion to mitigate the effects of the turbulence while still satisfying the pilot's intent. This suggestion may mitigate the current turbulence affecting the aircraft, or prevent or reduce the amount of turbulence the aircraft encounters in the future. That is, the turbulence manager can provide suggestions when the aircraft is currently encountering turbulence, or provide a suggestion before the aircraft encounters turbulence which if enacted by the pilot mitigates or avoids the turbulence altogether.

In one aspect, the turbulence manager generates the suggestion using the pilot intent and the aircraft metrics. For example, the pilot's intent may be to climb to a different altitude but the turbulence manager may determine, based on received turbulence data that the aircraft is likely to encounter turbulence at higher elevations. The turbulence manager can use the aircraft metrics to provide a suggestion that still satisfies this intent (e.g., climb to a higher altitude) but mitigates turbulence. For instance, the pilot may be climbing to an elevation of X, but instead, the turbulence manager suggests that the pilot climb to elevation X+5%. Because of the turbulence manager has access to the aircraft metrics, it can inform the pilot that climbing to an altitude of X+5% (e.g., a suggested change to a current operational state of the aircraft) would result in a fuel burn of Y and the plane would land with Z pounds of fuel, which can be calculated using the current weight of the aircraft and knowing its flight plan. Thus, the suggestion satisfies the pilot intent (e.g., climbing to a different altitude) but mitigates turbulence and can indicate the benefit of following the suggestion, such as a reduced fuel burn from avoiding the turbulence.

In another example, if the turbulence manager determines that the pilot intent is to continue at the current cruising altitude, after detecting turbulence, the turbulence manager can determine an optimized speed to fly through the turbulence using the current weight and altitude of the aircraft (as indicated by the aircraft metrics). The turbulence manager can display the suggestion (i.e., the calculated speed) and provide any benefits of flying at that speed—e.g., less turbulence or change in fuel burn. In this manner, the turbulence manager uses the current aircraft metrics to generate a suggestion that mitigates turbulence while still satisfying the pilot intent.

At block 230, the portable device outputs the suggestion to the pilot. In one aspect, the suggestion is output as text or graphics on a display. However, during turbulence, the pilot may be distracted by other instruments in the cockpit, in which case, the suggestion may be an audio output that explains the suggestion and its benefits.

In one aspect, the pilot may be able to select the suggestion using the portable device. For example, by selecting the suggestion, the portable device may instruct the FMS to enact the suggestion (e.g., climb to a different altitude, change speeds, change thrust, change heading, etc.). As discussed below, the portable device may have turbulent-resistance I/O elements which may make it easier to interact with the FMS.

However, in other aspects, the portable device may only output the suggestion to the pilot, and then the pilot can then enact that suggestion using other computing and control systems in the cockpit, such as the CDU.

Figure 3:
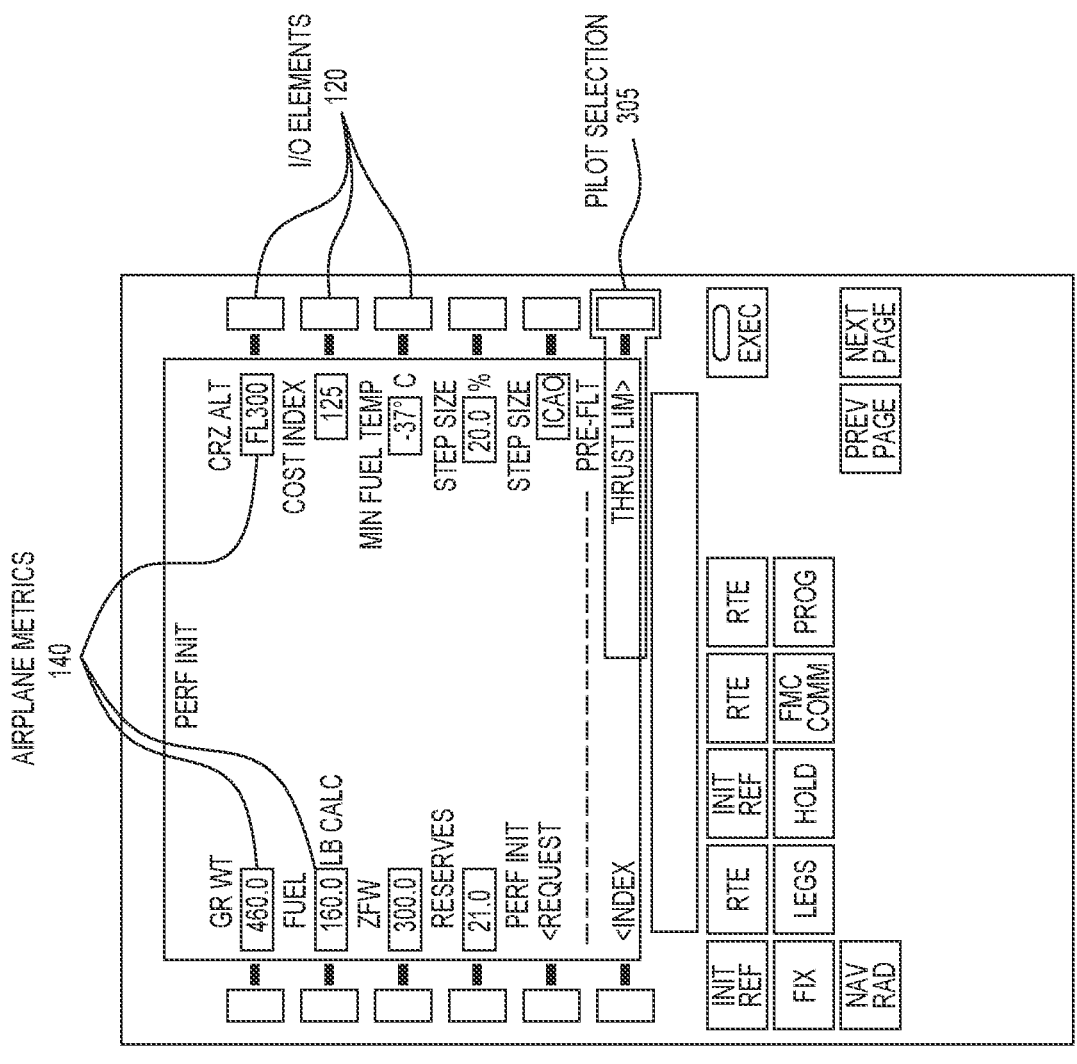
FIG. 3 illustrates a CDU.
Figure 3:

FIG. 3 illustrates a CDU 115. As shown, the CDU 115 can display aircraft metrics 140 (e.g., weight, fuel, and altitude) which are viewable to the pilot. In addition, the CDU 115 include I/O elements 120 (buttons in this case) through which the pilot can select certain features. In FIG. 3, the pilot has made a selection 305 to select the thrust limiting feature.

The CDU 115 in FIG. 3 can be used to perform certain steps in the method 200 in FIG. 2. For example, the pilot intent can be determined in response to the pilot selection 305. That is, the CDU 115 can inform the turbulence manager of the pilot selection 305 from which the turbulence manager can determine, along with other pilot selections, the intent of the pilot. Additionally, the turbulence manager can receive the aircraft metrics 140 from the CDU 115. For example, the CDU 115 may periodically transmit updates to the aircraft metrics 140 to the turbulence manager. Alternatively, the turbulence manager may request the aircraft metrics 140 from the CDU 115 in response to receiving an indication of turbulence (either measured or predicted). The turbulence manager can then use the pilot intent and the aircraft metrics to generate a suggestion for mitigating turbulence as described in the method 200.

Figure 4:
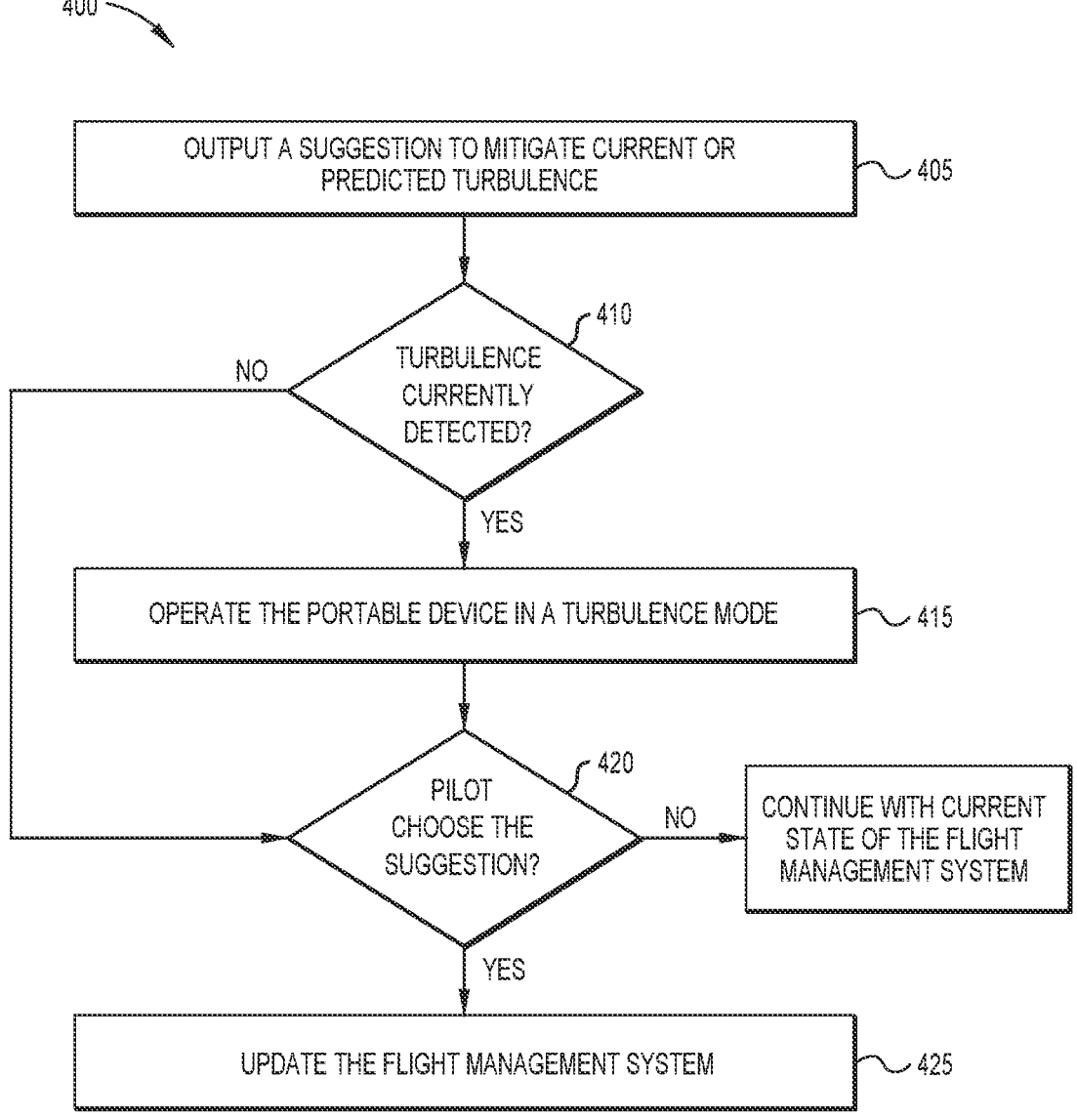
FIG. 4 is a flowchart for updating a FMS using an EFB during turbulence.

FIG. 4 is a flowchart of a method 400 for updating a FMS using an EFB during turbulence. That is, the method 400 assumes that the pilot can use a portable device (e.g., an EFB) to provide commands to the FMS.

At block 405, the turbulence manager in the portable device outputs a suggestion to mitigate current or predicted turbulence. That is, the turbulence manager can use the method 200 to generate a suggestion that the can be output by the portable device. This suggestion may be output while the aircraft is currently experiencing turbulence or before the aircraft is predicted to encounter turbulence.

At block 410, the turbulence manager in the portable device determines whether turbulence is currently detected. That is, the turbulence manager determines whether a turbulence sensor on the aircraft currently indicates the aircraft is experiencing turbulence.

If so, the method 400 proceeds to block 415, in which the portable device operates in a turbulence mode. Generally, operating in the turbulence mode mitigates the likelihood that the pilot hits or touches the wrong I/O element in the portable device (e.g., an erroneous selection). For example, because of sudden jolt or acceleration caused by turbulence, the pilot may contact a button (e.g., a capacitive button on a touch display) on the portable device that says "DO NOT PERFORM SUGGESTION" when she meant to press a button that says "DO PERFORM SUGGESTION." There are many different ways for operating in a turbulence mode to mitigate the risk that the pilot makes and incorrect selection. The discussion below describes some techniques that can be used, but is not intended to be a limiting or exclusive list.

In one aspect, the pilot may wear a glove that includes sensors which output data that can be used by the turbulence manager to track the location of the hand. For example, the sensors may be accelerometers, gyroscopes, radio frequency or infrared emitters used for location detection, and the like. The glove may include a wireless transmitter for transmitting the data generated by the sensors to the turbulence manager which can use the data to track the location of the user's hand or finger.

In one aspect, the turbulence manager uses the data from the sensors to determine the location of the pilot's finger relative to a GUI on the portable device. For example, the turbulence manager determines whether the finger is over one of the touch buttons in the GUI. In one aspect, the turbulence manager determines the location of the finger in 3D space which can be compared to the locations of the buttons. The turbulence manager can use the information provided by the sensors to determine which button the finger is approaching. Further, instead of wearing a glove, in other aspects, the pilot could wear a ring, bracelet, watch, and the like.

In another aspect, the portable device can include a camera to identify the location of the hand relative to the GUI displayed on the portable device. The camera is arranged such that its field of view captures objects (e.g., the pilot's hand) that approach the screen of the portable device so the turbulence manager can identify the location of the object relative to the buttons in the GUI.

Once the location of the pilot's finger (or other object) is identified, the turbulence manager can determine a spatial relationship between the finger and the buttons in the GUI displayed on the portable device. In one aspect, if the finger is more than an inch away from the screen of the portable device, the turbulence manager does not identify a portion of the GUI overlapped by the finger—i.e., does not identify a spatial relationship between the finger and the GUI. For example, the pilot may not have yet decided which of the buttons she wants to push. However, when the user moves the finger such that it is within one inch of the screen, the turbulence manager assumes the user has decided which button she wants to push. In response, the turbulence manager determines the location of the screen overlapped by the finger.

If the turbulence manager determines a change in the spatial relationship between the finger and a button in the GUI due to turbulence, then the turbulence manager determines this change was an unintended event (i.e., caused by turbulence rather than a conscience decision by the pilot). In response, the turbulence manager adjusts the position of the GUI so that the spatial relationship between the pilot's finger and the GUI (or more specifically, an interactive element within the GUI) is maintained. In one aspect, the turbulence manager can move the GUI to match the lateral movement of the finger caused by turbulence. That way, the finger remains aligned with the same interactive element in the GUI that it did before the turbulence. The turbulence manager may move the GUI up/down or left/right, or some combination of both.

In another aspect, the turbulence manager may shift only the interactive element but leave the rest of the elements in the GUI as they were. For example, if the finger was overlapping a touch button before the turbulent event, the turbulence manager may move the touch button so that the finger continues to overlap the button after the turbulent event. However, other elements in the GUI (e.g., other touch buttons or other displays and text) may remain stationary. In this manner, the turbulence manager can maintain the spatial relationship between the pilot's finger and an interactive element.

In another aspect, rather than moving the GUI (or portions of the GUI) in response to tracking the location of the pilot's hand, the turbulence manager may make the interactive elements in the GUI larger during the turbulence mode, which mitigates the likelihood the pilot selects the wrong button. In another example, operating in the turbulence mode may require the pilot to provide verbal confirmation of his selection. That is, after the pilot selects an interactive element, the portable device may prompt the pilot to verbally confirm that was the button she intended to select before executing the command.

At block 420, the portable device determines whether the pilot selected the suggestion. For example, the GUI may include a first interactive button the pilot can press to indicate she wants to execute the suggestion and a second interactive button the pilot can press to indicates she does not. If the suggestion has multiple actions (e.g., change altitude and speed), the pilot can use interactive elements to select whether she wants to perform some, all, or none of the actions in the suggestion.

If the pilot does not want to execute the suggestion (or, in other words, opts not to choose to execute the suggestion), the method 400 proceeds to block 425 where the FMS continues to operate the aircraft in its current state. However, if the pilot does choose to execute the suggestion, the method 400 proceeds to block 430 where the portable device sends instructions to the FMS to execute the suggestion. The portable device may transmit the same commands as would the pilot, and has the added convenience of the pilot being able to use the portable device which is likely more user friendly than the FMS. Use of the portable device may also be safer if the aircraft is currently experiencing turbulence since the portable device can operate in the turbulence mode to ensure that the portable device accurately captures the intention of the pilot. Put differently, the portable device may more accurately capture the intention of the pilot during turbulence than the I/O elements in the FMS.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

receiving, at a portable device, from a flight management system (FMS) of an aircraft, pilot input that was previously provided to the FMS, wherein the FMS is external to, and wirelessly connected to, the portable device;

inferring, at the portable device, pilot intent in response to the pilot input received from the FMS, wherein the pilot intent is a desired action the pilot wants the aircraft to perform as selected by the pilot via the pilot input, wherein inferring the pilot intent comprises mapping the pilot input to at least one of a plurality of pilot intents selected by pilots included within a table;

receiving, at the portable device, an indication of turbulence corresponding to the aircraft from a source external from the portable device;

receiving, at the portable device, aircraft metrics from the FMS;

preventing the pilot from entering an erroneous selection via the pilot input, wherein said preventing comprises tracking movement of a hand or a finger to determine a position of the hand or the finger relative to a screen displaying a graphical user interface, and maintaining a spatial relationship of the hand or the finger to the screen during turbulent motions by adjusting the graphical user interface; and after inferring pilot intent:

determining, in real time, at the portable device, a suggestion based on the aircraft metrics to mitigate the effects of the turbulence while still satisfying the pilot intent; and outputting the suggestion to a pilot using the portable device.

2. The method of claim 1, wherein determining the suggestion comprises:

using the aircraft metrics to determine a suggested change to a current operational state of the aircraft that still satisfies the pilot intent.

3. The method of claim 1, wherein the portable device is a handheld computing device and is in wireless communication with the FMS.

4. The method of claim 3, wherein the FMS includes a control display unit (CDU) integrated into a cockpit of the aircraft, wherein the CDU receives the pilot input used to infer the pilot intent.

5. The method of claim 1, further comprising:

upon determining the aircraft is currently experiencing turbulence, operating the portable device in a turbulence mode which reduces a likelihood the pilot provides an incorrect selection to an I/O element in the portable device; and receiving a selection, using the I/O element, indicating that the pilot wants to execute the suggestion.

6. The method of claim 5, further comprising:

transmitting at least one instruction from the portable device to the FMS to execute the suggestion, thereby changing a current operational state of the FMS.

7. A portable device, comprising:

a display; and a turbulence manager, configured to:

receive, at a portable device, from a flight management system (FMS) of an aircraft, pilot input that was previously provided to the FMS, wherein the FMS is external to, and wirelessly connected to, the portable device;

infer at the portable device, pilot intent in response to the pilot input received from the FMS, wherein the pilot intent is a desired action the pilot wants the aircraft to perform as selected by the pilot via the pilot input, wherein inferring the pilot intent comprises mapping pilot input to at least one of a plurality of pilot intents selected by pilots included within a table;

receive, at the portable device, an indication of turbulence corresponding to the aircraft from a source external from the portable device;

receive aircraft metrics from the FMS;

prevent the pilot from entering an erroneous selection via the pilot input by tracking movement of a hand or a finger to determine a position of the hand or the finger relative to a screen displaying a graphical user interface, and maintaining a spatial relationship of the hand or the finger to the screen during turbulent motions by adjusting the graphical user interface; and after inferring pilot intent:

determine, in real-time, a suggestion to mitigate the effects of the turbulence while still satisfying the pilot intent based on the aircraft metrics, and output the suggestion to a pilot using the display.

8. The portable device of claim 7, wherein determining the suggestion comprises:

using the aircraft metrics to determine a suggested change to a current operational state of the aircraft that still satisfies the pilot intent.

9. The portable device of claim 7, wherein the portable device is handheld, wherein the portable device further comprises:

a wireless interface configured to communicate wirelessly with the FMS.

10. The portable device of claim 7, wherein the turbulence manager is configured to:

upon determining the aircraft is currently experiencing turbulence, operate the portable device in a turbulence mode which reduces a likelihood the pilot provides an incorrect selection to a touch I/O element in the display; and receive a selection, using the touch I/O element, indicating that the pilot wants to execute the suggestion.

11. The portable device of claim 10, wherein the turbulence manager is configured to:

transmit at least one instruction from the portable device to the FMS to execute the suggestion, thereby changing a current operational state of the FMS.

12. A non-transitory computer readable storage medium comprising computer readable program code, the computer readable program code, when executed by a processor, performs an operation, the operation comprising:

receiving, at a portable device, from a flight management system (FMS) of an aircraft, pilot input that was previously provided to the FMS, wherein the FMS is external to, and wirelessly connected to, the portable device;

inferring, at the portable device, pilot intent in response to the pilot input received from the FMS, wherein the pilot intent is a desired action the pilot wants the aircraft to perform as selected by the pilot via the pilot input, wherein inferring pilot the intent comprises mapping the pilot input to at least one of a plurality of pilot intents selected by pilots included within a table;

receiving, at the portable device, an indication of turbulence corresponding to the aircraft from a source external from the portable device;

receiving, at the portable device, aircraft metrics from the FMS;

preventing the pilot from entering an erroneous selection via the pilot input, wherein said preventing comprises tracking movement of a hand or a finger to determine a position of the hand or the finger relative to a screen displaying a graphical user interface, and maintaining a spatial relationship of the hand or the finger to the screen during turbulent motions by adjusting the graphical user interface; and after inferring pilot intent:

determining, in real-time, at the portable device, a suggestion to mitigate the effects of the turbulence while still satisfying the pilot intent based on the aircraft metrics; and outputting the suggestion to a pilot using the portable device.

13. The non-transitory computer readable storage medium of claim 12, wherein determining the suggestion comprises:

using the aircraft metrics to determine a suggested change to a current operational state of the aircraft that still satisfies the pilot intent.

14. The non-transitory computer readable storage medium of claim 12, wherein the portable device is a handheld computing device and is in wireless communication with the FMS.

15. The non-transitory computer readable storage medium of claim 14, wherein the FMS includes a control display unit (CDU) integrated into a cockpit of the aircraft, wherein the CDU receives the pilot input used to infer the pilot intent.

16. The non-transitory computer readable storage medium of claim 12, wherein the operation further comprises:

upon determining the aircraft is currently experiencing turbulence, operating the portable device in a turbulence mode which reduces a likelihood the pilot provides an incorrect selection to an I/O element in the portable device; and receiving a selection, using the I/O element, indicating that the pilot wants to execute the suggestion.

17. The non-transitory computer readable storage medium of claim 16, wherein the operation further comprises:

transmitting at least one instruction from the portable device to the FMS to execute the suggestion, thereby changing a current operational state of the FMS.

18. The method of claim 1, wherein the desired action the pilot wants the aircraft to perform comprises: landing, taking off, changing altitude, and maintaining a cruising altitude.

19. The method of claim 1, wherein inferring the pilot intent further comprises using a location of where the aircraft is on a flight path.

20. The portable device of claim 7, wherein the turbulence manager is further configured to infer the pilot intent by using a location of where the aircraft is on a flight path.

* * * * *